United States Patent [19]
Goto

[11] 3,936,850
[45] Feb. 3, 1976

[54] PHOTOGRAPHIC CAMERA EQUIPPED WITH AUTOMATIC FILM TRANSPORTING MECHANISM
[75] Inventor: Toshio Goto, Omiya, Japan
[73] Assignee: Fuji Photo Film Co., Ltd., Kanagawa, Japan
[22] Filed: Nov. 27, 1974
[21] Appl. No.: 527,781

[30] Foreign Application Priority Data
Nov. 27, 1973 Japan............................. 48-133708

[52] U.S. Cl................................. 354/212; 354/86
[51] Int. Cl.²...................... G03B 1/32; G03B 1/00
[58] Field of Search .......... 354/83, 84, 85, 86, 212, 354/178, 179

[56] References Cited
UNITED STATES PATENTS
2,012,334  8/1935  Barenyl.............................. 354/212
3,481,260  12/1969  Ettischer et al..................... 354/212

Primary Examiner—Robert P. Greiner
Attorney, Agent, or Firm—Sughrue, Rothwell, Mion, Zinn & Macpeak

[57] ABSTRACT

A photographic camera equipped with an automatic film transporting mechanism, a portion of which is incorporated into a hingedly supported lid which is provided at the rear of the camera for selectively opening and closing a film receiving chamber and the other portion is incorporated into the body of the camera. Linkage between the portion of the transporting mechanism in the back lid and the portion thereof in the camera body is achieved by the use of a motion transmitter mounted on a support spindle for supporting the back lid to the camera body.

3 Claims, 15 Drawing Figures

FIG. 8
FIG. 11
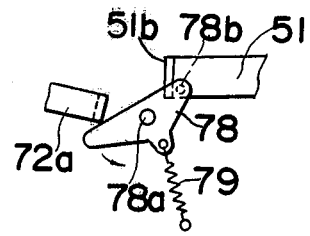
FIG. 12
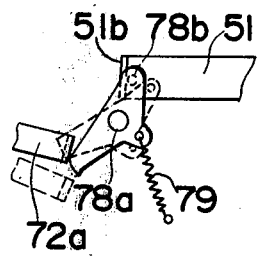
FIG. 13
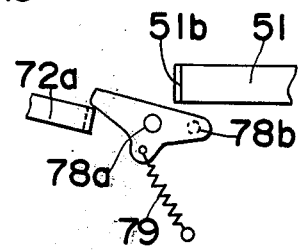
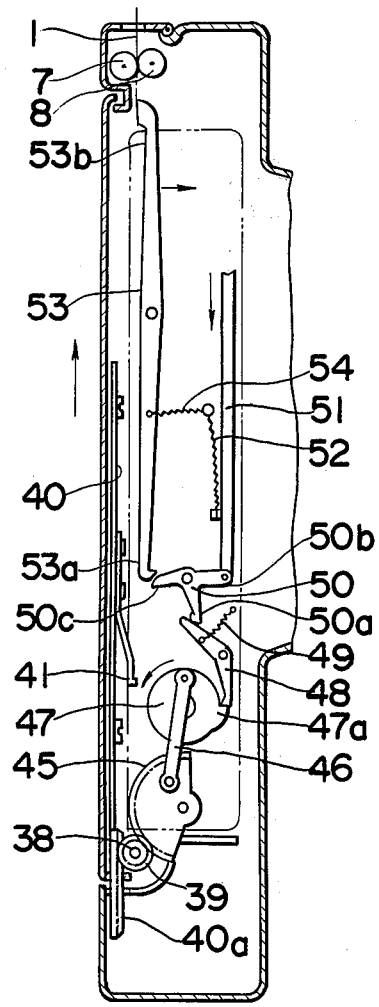
FIG. 10
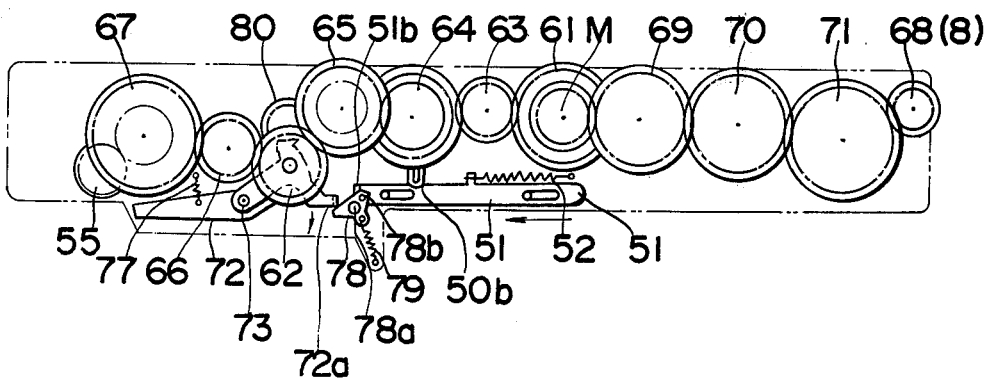

PHOTOGRAPHIC CAMERA EQUIPPED WITH AUTOMATIC FILM TRANSPORTING MECHANISM

BACKGROUND OF THE INVENTION

1. Field of the Invention

The present invention relates to an automatic film transporting mechanism in a photographic camera and, more particularly, to an automatic film transporting mechanism for transporting a photosensitive element, on which an image of an object to be photographed is reproduced, a portion of which transporting mechanism is incorporated into a hingedly supported lid which is provided at the rear of the camera for selectively opening and closing a film receiving chamber of the camera.

2. Description of the Prior Art

A conventional film pack frequently used with a photographic camera of self-processing type is known as accommodating therein a plurality of self-developing film units each including a stack of photosensitive sheets and a stack of image receiving sheets corresponding in number to said photosensitive sheets. The photosensitive sheets and the image receiving sheets are respectively positioned on both sides of a presser plate acting within the film unit pack to press the photosensitive sheets so as to be successively brought into a position ready to be exposed and facing towards the object to be photographed whenever the front most photosensitive sheet is withdrawn. Withdrawal of each of the photosensitive sheets after it has been exposed is carried out by outwardly pulling a related tab, which projects outwardly of the photographic camera, thereby permitting the front most photosensitive sheet to be transferred rearwardly of the presser plate. The photosensitive sheet that has been transported rearwardly of the presser plate is superposed to or aligned with a corresponding one of the image receiving sheets. As the tab is further pulled, the photosensitive sheet overlapping the corresponding image receiving sheet emerges together with said corresponding image receiving sheet out of said film unit pack through an exit slit formed in said pack at one end, and then passes through a gap between a pair of juxtaposed pressure applying rolls. As both the photosensitive sheet and the corresponding image receiving sheet pass through the juxtaposed pressure applying rolls, a diffusion transfer process takes place with a known viscous processing composition spreading from one end to the other between the photosensitive and image receiving sheets.

In the self-processing photographic camera utilizing the film pack of the type referred to above, employment of an automatic drive, such as an electrical motor or a clockwork mechanism, in a manner heretofore proposed in transporting the film, often provokes a lot of problems due to the fact that, in order for each film unit to travel or be transported in the manner as hereinbefore described, some parts of the film transporting mechanism should be installed in the camera adjacent the front of the film pack and the other in the camera adjacent the rear of the same film pack. On the other hand, adjacent the rear of the film pack housed within the film pack receiving chamber of the camera, there usually exists a hingedly supported lid for selective opening and closure of the film pack receiving chamber and, if some parts of the film transporting mechanism are operatively installed in the hingedly supported lid, a satisfactory and efficient mechanical linkage between them and the other parts which are operatively installed in the body of the camera would not be established with simple and compact structure.

Accordingly, an essential object of the present invention is to provide a construction wherein a portion of the film transporting mechanism for transporting a self-developing film unit in a predetermined manner is installed in the hingedly supported lid of the photographic camera in a compact structure while the other portion is installed in the body of the camera, thereby substantially overcoming the problems heretofore encountered in the art concerned.

According to the present invention, the aforesaid object can be simply accomplished by operatively linking the portions of the film transporting mechanism in the hingedly supported lid on one hand and in the body of the camera on the other hand to each other through a support spindle which is used to hingedly support the lid to the body of the camera. More specifically, according to a preferred embodiment of the present invention, the support spindle is, on one hand, mounted with a pinion coaxial with said support spindle and, on the other hand, the hingedly supported lid has an inside surface mounted with a toothed rack for linear movement along the inside surface thereof, said pinion and said toothed rack being constantly engaged to each other irrespective of the selective opening and closing of the hingedly supported lid.

Operation of the film transporting mechanism component in the body of the camera can be transmitted to the film transporting mechanism component in the hingedly supported lid through the constant engagement between the pinion and toothed rack whereby the self-developing film unit can be transported by a hook member movable together with the toothed rack and engaging the film unit.

Means for operatively associating the film transporting mechanism components in the body of the camera one hand and in the hingedly supported lid on the other hand, may not be limited to the hereinabove and hereinafter described arrangement. However, this arrangement is advantageous in that the film transporting components are constantly engaged to each other irrespective of the positioning of the hingedly supported lid in relation to the body of the camera without requiring any complicated structural part to be installed in the hingedly supported lid and in that, even when the hingedly supported lid is closed, the hook member of the film transporting mechanism component in the hingedly supported lid automatically occupies a predetermined position in relation to the film units.

These and other objects and features of the present invention will become apparent from the following description taken in conjunction with preferred embodiments of the present invention with reference to the accompanying drawings.

BRIEF DESCRIPTION OF THE DRAWINGS

FIG. 8 is a top sectional view of the body of the camera showing the film transporting mechanism in its substantial entirety, FIG. 10 is a top sectional view of the body of the camera showing a power transmission for driving various components of a film transporting mechanism according to a second preferred embodiment of the present invention, which utilizes the film pack of FIG. 9, FIG. 11 to FIG. 13 are schematic diagrams illustrating a sequential process of moving a slider employed in the transporting mechanism according to the second preferred embodiment.

DESCRIPTION OF THE PREFERRED EMBODIMENTS

Figure 1:
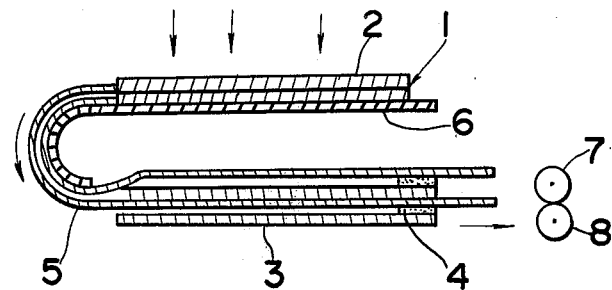
FIG. 1 and FIG. 2 are schematic top sectional views showing self-developing film units with a pack removed, which can be employed in a self-processing camera herein disclosed according to the present invention.

Referring first to FIG. 1, there is shown a plurality of, for example, two stacked self-developing film units which can be employed in a self-processing photographic camera equipped with the film transporting mechanism according to the present invention, a film unit pack for which is not shown for the sake of simplification of the description. However, it should be noted that like parts are designated by like reference numerals throughout the several views of the accompanying drawings for better understanding of the present invention.

Each of the film units 1 shown includes a photosensitive sheet 2 which, when loaded in a self-processing camera and subsequently exposed to a subject to be photographed through the objective lens assembly of the camera, receives from the direction indicated by the arrows rays of light carrying an image of the subject to be photographed and records thereon a negative image of the subject, an image receiving sheet 3 which records a positive image of the subject transferred from the negative image, a composition pod 4 containing a viscous processing composition to be diffused between the sheets 2 and 3, and a leader 5 having one end connected to the photosensitive sheet 2 and the other end exposed to the outside of the film unit pack through a withdrawal opening (not shown) formed in the film unit pack at one end. These film units 1 are housed within the film unit pack with the sheets 2 and 3 positioned on opposite sides of a presser plate 6 acting within the film unit pack to press the photosensitive sheets 2 so as to be successively brought into a position ready to be exposed facing towards the object to be photographed, whenever the frontmost sheet of these sheets 2 is withdrawn.

The arrangement of the film units within the pack so far shown in FIG. 1 is substantially similar to that conventionally employed in a film unit pack utilizable in a commercially available self-processing photographic camera, but a slight difference resides in that each of the leaders according to the conventional arrangement of the film units is provided with a tab required to be manually pulled to permit both the photosensitive sheet and the image receiving sheet to be superposed to each other and also to be passed in between the juxtaposed pressure applying members or rolls, whereas according to the present invention as clearly shown in FIG. 1, no tab is required in view of the fact that film unit transportation and withdrawal are automatically carried out by the film unit transporting mechanism and the juxtaposed pressure applying rolls.

In the arrangement shown in FIG. 1, the leading end of each of the leaders 5 is advanced in a direction towards the juxtaposed pressure applying rolls 7 and 8 by the film unit transporting mechanism of the present invention, subsequently engaging in between the juxtaposed pressure applying rolls 7 and 8. The leader 5 is further advanced by the rotation of the rolls 7 and 8 thereby causing the photosensitive sheet 2 to be superposed upon the associated image receiving sheet 3, which is then passed through the rolls 7 and 8 together with the image receiving sheet 3.

Figure 2:
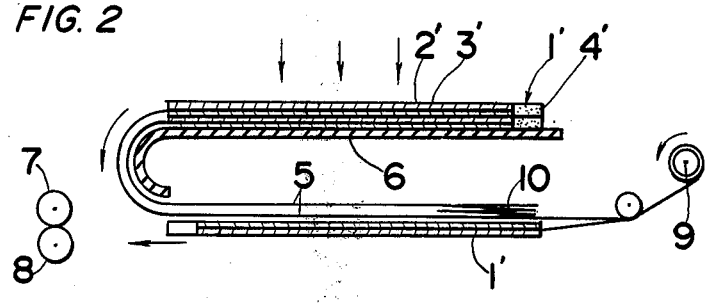

FIG. 2 illustrates another arrangement of the film units within the film unit pack. In this arrangement, each of the film units 1' is composed of a photosensitive sheet 2' and an image receiving sheet 3' permanently overlapped to said photosensitive sheet 2'. Each of the film units 1' composed of the photosensitive and image receiving sheets 2' and 3' has one end provided with a composition pod 4' for containing a viscous processing composition and the other end connected with a leader 5' which is pulled to transport the film unit 1' to another position. The free end of the leader 5' is coupled to the spool 9 which is provided within the film unit pack as will be described later, so that, when this spool 9 is rotated by the automatic drive mechanism built in the camera as will be described later, the first one of the film units 1' after having been exposed can be transported to the rear of the presser plate 6 within the film unit pack. In FIG. 2, the first film unit 1' is shown as having already transported to the rear of the presser plate 6.

The leaders 5 respectively coupled to the film units 1' are connected to each other by associated auxiliary leaders 10 so that these film units 1' can be successively transported from a position where each of said film units is exposed to another position where they are successively associated with the automatic film transporting mechanism as will be described later. Each of the film units 1' which has been brought to the rear of the presser plate 6 is subsequently transferred onto the juxtaposed rolls 7 and 8. As the film unit is transferred onto the rolls 7 and 8, the leader 5 connected to this film unit is separated.

Figure 3:
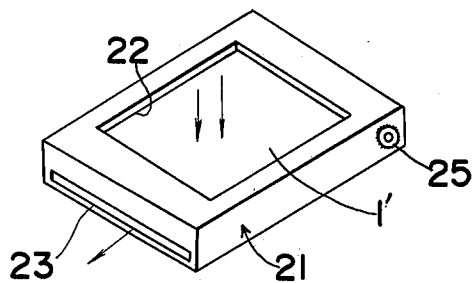
FIG. 3 is a schematic perspective view of a self-developing film unit pack, showing the front thereof
Figure 4:
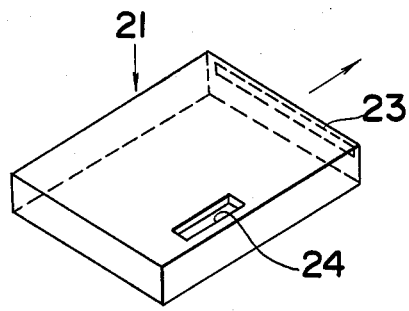
FIG. 4 is a similar view to FIG. 3, but showing the rear thereof.

FIGS. 3 and 4 illustrate a film unit pack 21 for accommodating the film units 1' in the arrangement of FIG. 2. Each of the film units within the pack 21 is adapted to be with drawn out of the pack 21 through an outlet, formed therein as at 23, after having been exposed through a front opening formed in said pack 21 at the front thereof as at 22, and subsequently been transported in the manner as hereinbefore described. The pack 21 is also formed at the rear thereof with a slit 24 cooperative with the film transporting mechanism in a manner as will be described later. The take-up spool 9 hereinbefore referred to is held in position within the film unit pack 21, at least one end of which is exposed outside the pack 21 and rigidly mounted with a driven gear 25 adapted to be operatively coupled to the drive mechanism built in the body of the camera.

A film unit pack useable to accommodate the film units in the arrangement of FIG. 1 may be similar to the pack shown in FIGS. 3 and 4, but the driven gear 25 may be omitted.

Figure 5:
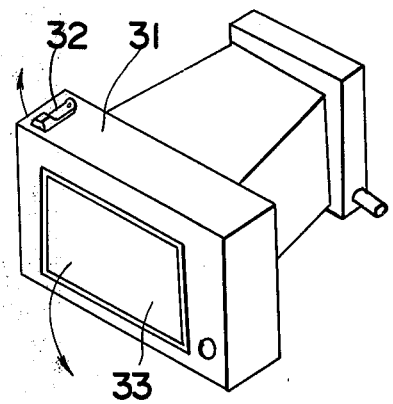
FIG. 5 is a schematic perspective view of a self-processing camera.

Referring now to FIG. 5, the self-processing photographic camera is shown as viewed from the rear thereof and has the body 31 including a hingedly supported back lid 33 shown in a closed position. The body 31 has a built-in lock device of any known type including a release lever 32 which, if moved in a direction indicated by the arrow, unlocks the lock device to permit the back lid 33 to pivot in a direction indicated by the arrow so as to assume an opened position from the closed position in readiness for loading or unloading the film unit pack 21 into or from the pack receiving chamber at the rear of the camera body 31. It should be noted that, when the film unit pack 21 is loaded in position within the pack receiving chamber in the camera body 31, the same is held therein with the slit 23 and the front opening 22 respectively facing the inside surface of the back lid 33 and the objective lens assembly (not shown) situated forwardly of the camera body 31.

Figure 6:
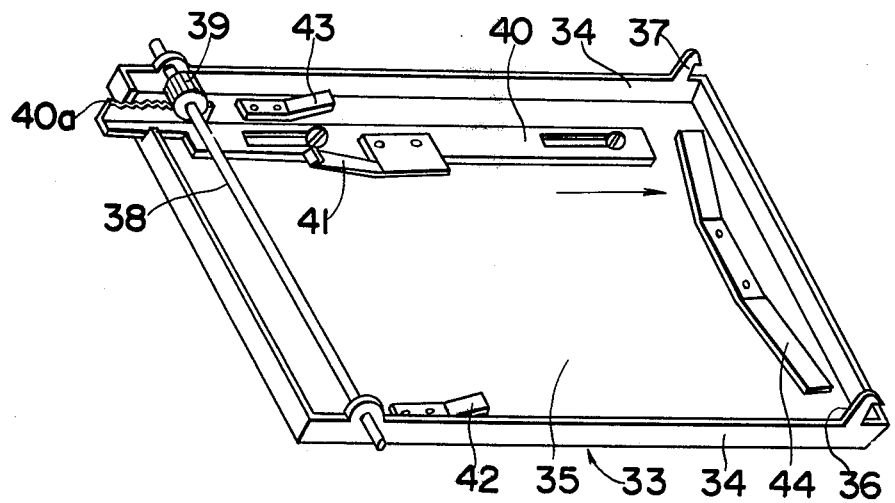
FIG. 6 is a perspective view of a hingedly supported back lid of the camera of FIG. 5, showing a component of a film transporting mechanism installed in the back lid.

The details of a component of the film transporting mechanism installed in the back lid 33 are best shown in FIG. 6, reference to which will now be made. The back lid 33 in FIG. 6 is shown as separated from the camera body 31 and has a four-cornered rib 34 protruding therefrom towards the camera body 31 and defining a pair of opposed side walls and a pair of opposed top and bottom walls, all walls surrounding the inside surface of the back lid 33. The rib 34 is formed as at 36 and 37 with engagements forming a part of the known back lid locking device for locking the back lid 33 in the closed position so long as the release lever 32 is not operated.

Opposed to the engagements 36 and 37, the lid 33 is pivotally mounted on a support spindle 38 extending through the bottom and top walls of the rib 34, both ends of which are journalled to the camera body 31 in any known manner and as shown in FIG. 8. A lazy pinion 39 is axially non-rotatably mounted on the support spindle 38 adjacent one end thereof, which is in turn constantly meshed to a toothed portion 40a of a toothed rack 40 carried by the back lid 33 for reciprocal movement in a lengthwise direction thereof in parallel to the plane of the inside surface 35 of the back lid 33. The toothed rack 41 is integrally provided with a hook member 41 which engages each film unit within the pack 21 through the slit 24 for transporting said film unit as the rack 40 moves in one direction. The back lid 33 is provided on its inside surface 35 with a plurality of presser pieces 42, 43 and 44 for pressing the film unit pack 21 so as to firmly hold the latter in position within the pack receiving chamber in the camera body 31 when and so long as the back lid 33 is in the closed position with the pack 21 in said pack receiving chamber.

Figure 7:
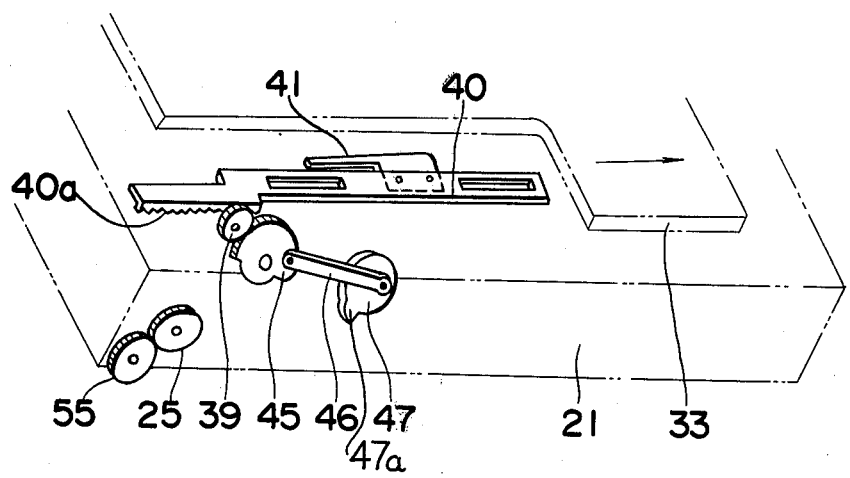
FIG. 7 is a schematic perspective view showing a linkage between the components of the film transporting mechanism respectively installed in the back lid and in the body of the camera.

Referring to FIGS. 7 and 8 which respectively illustrate a manner of operative linkage between the film transporting mechanism components in the back lid 33 and in the camera body 31 and the details of mechanical parts achieving such operative linkage, both being shown in the condition wherein the back lid 33 is closed, it will be seen that the pinion 39 meshed with the toothed portion 40a of the rack 40 is in turn meshed to a segmental gear 45 pivotally supported in the camera body 31. Associated with this segmental gear 45 is a rotary disc 47 rotatably supported in the camera body 31 and connected therewith by means of a crank rod 46 whereby 360° rotation of the rotary disc 47 causes the segmental gear 45 to reciprocately pivot through a predetermined angle in both directions. This rotary disc 47 is adapted to be driven in one direction by a known drive unit (not shown) which may be in the form of an electrically driven motor or a clockwork mechanism.

The rotary disc 47 is formed on its outer periphery with a redially outwardly protruding stopper 47a adapted to engage against one end of a detent lever 48 which is also pivotally supported in the camera body. This detent lever 48 is so biased in one direction by a spring element 49 that said one end of said lever 48 is in contact with the outer peripheral surface of said disc 47 and holds the disc 47 at a definited position by its engagement to the stopper 47a.

Pivotally supported in the camera body 31 adjacent the other end of the detent lever 48 is a transmitter lever 50 having three radially outwardly protruding arms 50a, 50b and 50c; the arm 50a being engageable to the other end of the detent lever 48, the arm 50b pivotally connected to a slider 51 and the arm 50c being engageable to a hooked end 53a of a detector lever 53 which is pivotally supported in the camera body 31. The slider 51 is connected or associated with a release button (not shown) so that it moves in a direction indicated by the arrow in FIG. 8 against the bias of a spring element 52 in response to release button operation, thereby causing the transmitter lever 50 to pivot in a clockwise direction. The pivotal movement of the lever 50 thus effected in the clockwise direction has the result that the arm 50a causes the detent lever 48 to pivot against the spring element 49 thereby permitting the one end of said lever 48 to disengage from the stopper 47a of the rotary disc 47.

It should be noted that the release button is adapted to be operated after the spool 9 within the film unit pack 21 has had been driven by the automatic drive mechanism as will be described later to wind the leader 5' and the film unit 1' has therefore been transported to the rear of the presser plate 6 within the film unit pack.

The detector lever 53 is normally biased in one direction about its pivot by a spring element 54 and has a feeler end 53b opposed to the hooked end 53a, which feeler end 53b is situated between the juxtaposed rolls 7 and 8 and the outlet 23 of the film unit pack 21 so as to detect the passage of the film unit 1' from the outlet 23 onto the rolls 7 and 8. Upon pivotal movement of the transmitter lever 50 in the clockwise direction effected in the manner as hereinbefore described and so long as the feeler end 53b of the detector lever 53 does not detect the passage of the film unit 1', the arm 50c is engaged with the hooked end 53a whereby, irrespective of the operation of the release button (not shown), the transmitter lever 50 can be held as pivoted clockwise with the arm 50a pressing the other end of the detent lever 48 against the spring element 49 so as to disengage the other end of the lever 48 from the stopper 47a. Disengagement between the arm 50c and the hooked end 53a takes place when the feeler end 53b detects the film unit emerging from the outlet 23 of the pack 21 at which time the detector lever 53 is pivoted in the other direction against the spring element 54.

The pair of the pressure applying rolls 7 and 8 are rotatably supported in any known manner within the camera body 31 adjacent the outlet 23 of the loaded film unit pack 21, one or both of said rolls 7 and 8 being, according to the present invention, operatively coupled to a known drive unit (not shown) which may be in the form of an electrically operated motor or a clockwork mechanism and which way be the automatic drive unit described as used to drive the spool 9.

Referring back to FIG. 7, the driven gear 25 coaxial with the spool 9 is, when the film unit pack 21 is loaded into the pack receiving chamber of the camera, engageable to a drive gear 55 adapted to be driven by the automatic drive mechanism housed in the camera body 31.

The self-processing camera constructed as hereinbefore fully described operates in the following manner.

When the back lid 33 is opened or closed for loading the film unit pack 21 into or removal from the pack receiving chamber, the back lid 33 pivots about the support spindle 38. At this time, the toothed portion 40a of the toothed rack 40 carried by the back lid also pivots about the axis of the spindle 38 without moving the rack 40 and without rotating the pinion 39 because the latter is not rigidly mounted on the spindle 38. More specifically, pivot of the rack 40 together with the back lid merely shifts the position at which engagement between the toothed portion 40a and the pinion 39 takes place. Therefore, the hook member 41 does not move.

Assuming that the film unit pack 21 with film units 1' therein has been loaded into the pack receiving chamber of the camera body 31 and the back lid 33 has subsequently been closed, the hook member 41 carried by the rack 40 is inserted into the pack 21 through the slit 24 without being moved by the reason as hereinbefore described.

Subsequently, by operating a known built-in exposure control system of the camera, so as to expose the first of the film units 1' within the pack 21, the automatic drive mechanism is operated, in a substantially similar manner to a so-called motor-drive system of a photographic camera, to drive the drive gear 55. Rotation of the drive gear 55 is then transmitted through the driven gear 25 to the spool 9 within the pack 21 so that the leader 5 extending from the exposed film unit 1' is wound around the spool 9 until the exposed film unit 1' is brought to the rear side of the presser plate 6.

While the first film unit 1' is conditioned as hereinabove described, operation of the release button (not shown) causes the slider 51 to move in the direction of the arrow against the bias of spring element 52, thereby permitting the transmitter lever 50 to pivot clockwise. Upon the clockwise pivot of the lever 50, the arm 50a thereof causes the detent lever 48 to pivot counterclockwise against the spring 49, thereby disengaging that end of the lever 47a from the stopper 47a in the rotary disc 47. Simultaneously therewith, the arm 50a of the lever 50 engages the hooked end 53a of the detector lever 53 and is held in engaged position. The rotary disc 47 is, upon disengagement between the lever 48 and the stopper 47a, driven by the known drive unit (not shown). In the case where the drive unit is employed in the form of an electrically operated motor, an arrangement may be such that a switch inserted in the electric circuit of the motor is closed to energize said motor in response to the movement of the slider 51. In any event, rotation of the disc 47 is transmitted to the segmental gear 45 through the crank rod 46 so that the segmental gear 45 can be oscillated in the opposite directions. This oscillation movement of the segmental gear 45 is then transmitted to the rack 40 through the pinion 39 by means of the toothed portion 40a and, therefore, the hook member 41 is oscillated in opposite directions. As the rack 40 moves in one direction indicated by the arrow in FIG. 9, the hook member 41 moves within the film unit pack 21 thereby transporting the film unit 1' towards the rolls 7 and 8 through the outlet 23. The film unit thus transported is subsequently sandwitched in between the rolls 7 and 8 then driven by the automatic drive mechanism (not shown) and, therefore, is further transported to the outside of the camera body 31 while the pod 4' is broken to permit the viscous processing composition to be spread between the sheets 2' and 3' of the film unit 1'.

After the hook member 41 has been moved to effect the transportation of the film unit in the manner as hereinbefore described, it commences to return to the original position moving in the other direction in sliding contact with the back surface of the leader 5' extending from the next film unit 1'. This return movement completes at the time the segmental gear 45 completes its oscillatory pivotal movement.

Immediately after the film unit has emerged from the outlet 23 of the pack 21 towards the rolls 7 and 8, the feeler end 53b of the detector lever 53 engages the film unit whereby the lever 53 is pivoted clockwise against the tension spring 54 with the hooked end 53a disengaging from the arm 50c of the lever 50. Thereupon, the transmitter lever 50 is pivoted counterclockwise by the action of the spring element 52 so that the detector lever 48 is returned to the original position as shown in FIG. 8 by the spring element 49 with that end thereof brought in position ready to engage the stopper 47a to stop rotation of the rotary disc 47.

Though the pivotal movement of the detector lever 53 in the clockwise direction takes place after the hook member 41 has been moved a predetermined distance to transport the film unit towards the outlet 23 of the film pack 21, the detent lever 48 is brought into position with that end thereof engaged to the stopper 47a at the time of completion of each rotation of the disc 47.

Figure 9:
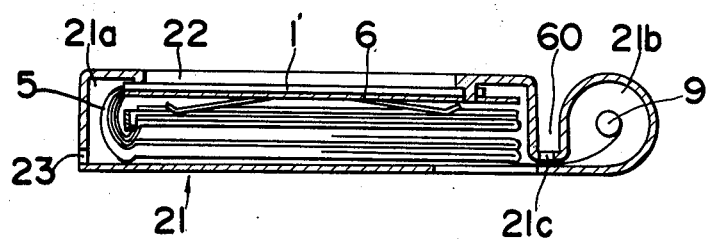
FIG. 9 is a schematic top sectional view of a modified film pack.
Figure 14:
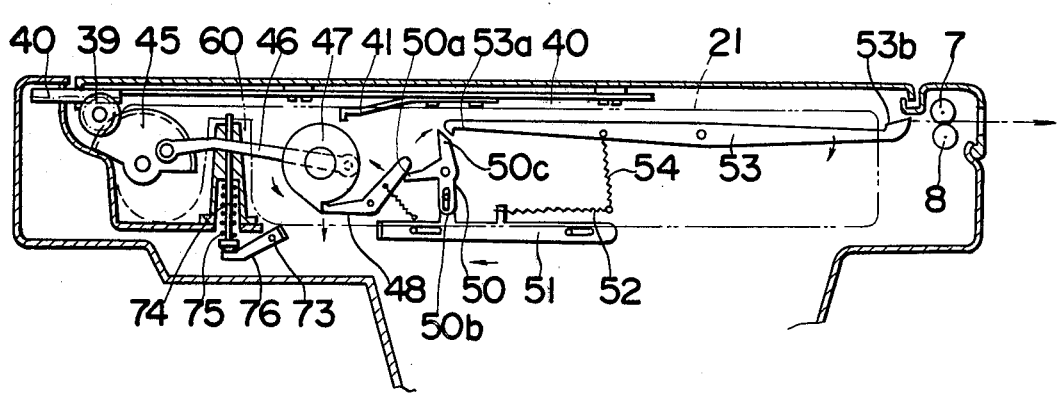
FIG. 14 is a similar view to FIG. 8, but showing the film transporting mechanism according to the second preferred embodiment.

Referring now to FIG. 9, the film unit pack 21 is divided into a film chamber 21a and a leader winding chamber 21b in which the spool 9 is contained. This division may be carried out by the use of any suitable partition member or bending a portion of the front plate member of the pack 21 in a manner substantially shown in FIG. 9.

The film unit pack 21 shown in FIG. 9 is advantageously useable with the transporting mechanism shown in FIGS. 10 to 15 and, to this end, the front plate of the pack 21 is bent to provide a groove 60 adjacent to the front window 22 and is formed with a hole 21c.

Referring now to FIGS. 10 to 15, although in the foregoing embodiment the slider 51 has been described as associated with the release button (not shown) so that it moves in the direction indicated by the arrow against the spring element 52 in response to the operation of the release button, the slider 51 in this embodiment of FIGS. 10 to 15 is moved in the manner which will now be described.

As best shown in FIG. 10, an electrically operated drive motor has a drive shaft M mounted with a gear 61 a rotational force of which is transmitted both to the drive gear 55 through a clutch gear 62 by means of a plurality of gear trains 63, 64, 65, 66 and 67 and to a drive gear 68 coaxial with the roll 8 through a plurality of gear trains 69, 70 and 71. The motor is adapted to be energized to rotate the drive shaft M when the shutter release button is depressed and prior to the shutter being operated.

The clutch gear 62 is rotatably mounted on a support 72 pivotally secured to the camera body through a spindle 73, and is angularly movable between a engaged position in which condition said clutch gear 62 is in position to transmit the rotation of the gear 65 to the gear 66 and a disengaged position in which condition the clutch gear 62 is in position to interrupt transmission of the rotation of the gear 65 to the gear 66.

This movement of the slider 51 according to the embodiment shown in FIGS. 10 to 15 is effected in the following manner. As shown, a detent pin 74 is axially slidably supported by a wall member in the camera body and is normally biased by a compression spring 75 with one end in contact with a presser bar 76 and the other end adapted to extend through the hole 21 formed in the film unit pack 21 and then through a perforation (not shown) in the leader 5 coupled to the associated film unit 1'. The presser bar 76 is supported on the spindle 73 for pivotal movement together with said spindle 73 and also with the support 72 carrying the clutch gear 62. Alternatively, the presser bar 76 may be integrally formed with the support 72 which is in turn pivotally mounted on the spindle 73 in an axially non-movable manner. As the presser bar 76 pivots about the spindle 73 pressing the one end of said detent pin 74 to axially move said pin 74, the other end of said detent pin 74 extends through the hole 21c into a perforation (not shown) formed in the leader 5 coupled to the associated film unit 1' on one hand and on the other hand the support 72 simultaneously pivots about the spindle 73 pulled by a tension spring 77. It is to be noted that the pulling force of the tension spring 77 is also transmitted to the presser bar 76 through the spindle 73.

As the support 72 pivots pulled by the tension spring 77 in the manner as hereinbefore described, as best shown in FIGS. 10 to 12, a kicker formed in the support 72 as at 72a causes a triangular piece 78, which is pivotally supported as at 78a and is pulled by a tension spring 79 to assume a neutral position, to pivot about the pivot 78a in such a manner as substantially sequentially shown in FIGS. 11 to 13. In other words, as the triangular piece 78 pivots counterclockwise as viewed from FIG. 10, a pin 78b secured at one apex portion of said triangular piece 78 engages to a bend portion 51b of the slider 51 and, as said triangular piece 78 is further pivoted, said pin 78b causes said slider 51 to move in the direction of the arrow against the bias of tension spring 52, thereby permitting the rotary disc 47 to rotate in the same manner as hereinbefore described in connection with the foregoing embodiment.

Figure 15:
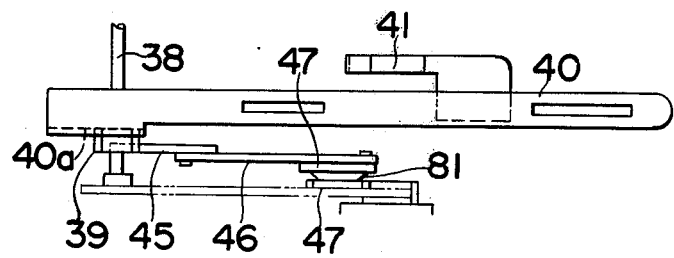
FIG. 15 is a schematic diagram showing a manner by which the disc and a gear engage to each other in the film transporting mechanism according to the second preferred embodiment of the present invention.

Rotation of the rotary disc 47 is possible by the following reason. Since the support 72 together with the presser bar 76 is pivoted as pulled by the tension spring 77, the clutch gear 62 is brought to the disengaged position. However, rotation of the gear 65 is also transmitted to a friction gear 80 which is frictionally contacted to the rotary disc 47, as shown in FIG. 15, through an elastic washer 81 rigidly secured to either of said friction gear 80 or said rotary disc 47.

In this way, the exposed film unit 1' can be transported onto the juxtaposed rolls 7 and 8 while the other end of the detent pin 74 engages in the perforation in the leader 5. Immediately after the exposed film unit has been sandwiched in between the rolls 7 and 8, it can be rapidly transferred out of the camera tearing the leader 5 from the film unit. It is to be noted that the auxiliary leader 10 connected to the leader 5 extending from the next film unit 1' has been already wound around the spool 9 together with the leader 5 extending from the exposed film unit so that the next film unit is, after having subsequently been exposed, ready to be transported to the rear of the presser plate 6 within the film unit pack 21.

While disengagement of the clutch gear 62 from the gears 65 and 66 takes place as the shutter release button is further depressed after the exposure has taken place, return of the gear 62 to the disengaged position and, accordingly, return of the support 72 together with the presser bar 76 can be effected by a suitable actuating mechanism (not shown) which may be operated in response to the next depression of the shutter release button or which may be actuated by pressing any suitable release button separate of the shutter release button. Of course, after the clutch gear 62 is moved to the engaged position, the other end of the detent pin 74 disengages from the perforation in the leader 5 coupled to the next film unit.

From the foregoing full description of the present invention, it has now become clear that the film transporting mechanism of the present invention comprises a back lid hingedly supported by the camera body for selectively opening and closing the pack receiving chamber of the camera for mounting and removal of the film unit pack into and from said pack receiving chamber, by means of a support spindle journalled in the camera body, and means for transporting the film units within the pack, said transporting means being supported for movement relative to the back lid and a rotatable member mounted on said spindle, said rotatable member being adapted to be driven by a drive device provided in the camera body.

This construction ensures constant engagement between components of the transporting mechanism in the camera body on one hand and in the back lid on the other hand irrespective of selective opening and closing of the back lid, which feature is advantageous in that the film units can be reliably and effectively transported.

Although the present invention has been fully described in conjunction with the preferred embodiments thereof with reference to the accompanying drawings, various changes and modifications are apparent to those skilled in the art. For example, the technical concept of the present invention can also be equally applicable to transportation of any other suitable photosensitive element such as an ordinary negative or positive films.

Therefore, these changes and modifications should, unless otherwise they depart from the true scope of the present invention, be construed as included therein.

What is claimed is:

1. In a photographic camera having a camera body provided at the rear thereof with a hingedly supported back lid for selectively opening and closing a chamber for accommodating therein a photosensitive element on which an image of a subject to be photographed is recorded, said back lid being supported to the camera body by means of a spindle supported in position on said body and within said chamber, a transporting mechanism which comprises a motion transmitter mounted on said spindle, means for transporting said photosensitive element, means for mounting said transporting means within said back lid for movement relative to said back lid, a drive unit built in said camera body, and means for operatively coupling said motion transmitter to said drive unit for transporting said photosensitive element through said transporting means.

2. A photographic camera as claimed in claim 1, wherein said motion transmitter comprises a pinion gear non-rotatably mounted on said spindle in coaxial relation to said spindle.

3. A photographic camera as claimed in claim 2, wherein said transporting means comprises a toothed plate member slidably carried by said back lid and having a toothed portion constantly engaged with said pinion gear.

* * * * *